May 15, 1934.  C. G. GASE  1,958,817
ADAPTER AND TOOL HOLDER
Filed July 29, 1932
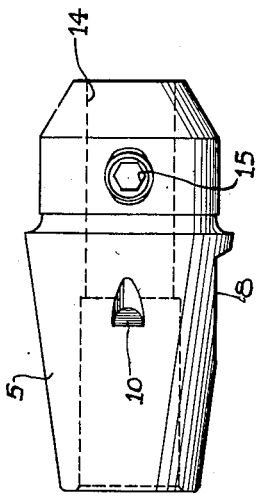
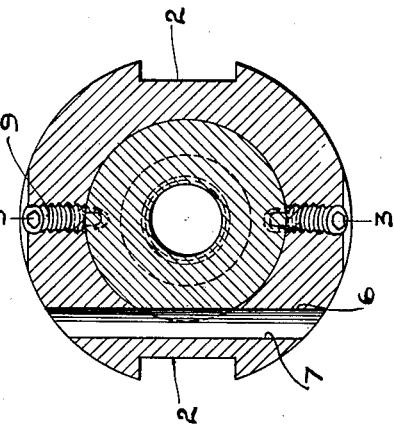
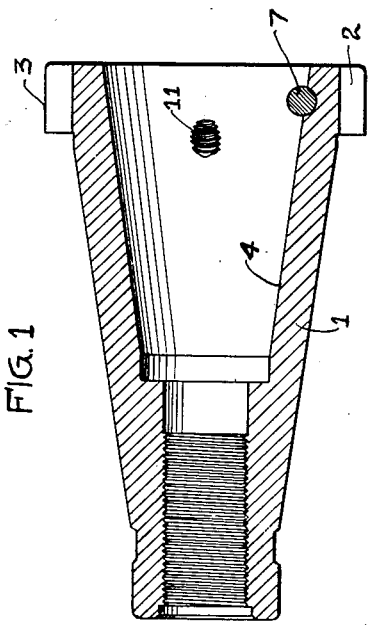
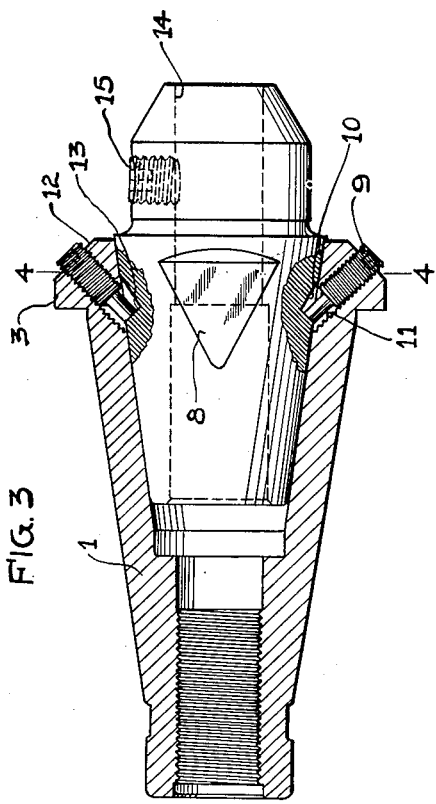
Inventor
Carl G. Gase
By Fisher, Moser Moore
Attorney Patented May 15, 1934

1,958,817

UNITED STATES PATENT OFFICE 1,958,817

ADAPTER AND TOOL HOLDER

Carl G. Gase, Cleveland, Ohio, assignor to The Weldon Tool Company, Cleveland, Ohio, a corporation of Ohio Application July 29, 1932, Serial No. 625,623

1 Claim. (Cl. 279—83)

This invention relates to adapters and tool holders for milling machines and the like, and has for its general object to provide an adapter in which the tool holder can be quickly inserted and securely interlocked therewith, and as easily and quickly removed therefrom.

A further object of the invention is to provide simple means for accurately centering and guiding the tool holding member to proper interlocking position within the adapter.

A further object of the invention is to provide means for forcing the holder member to its seat with evenly applied pressure thus insuring smooth and true operation of the tool.

A still further object of the invention is to provide for the rapid interlocking of the holder in the adapter and for releasing the same therefrom as required, without the necessity of removing the adapter from the machine.

Other objects and advantages of the invention will be apparent from a consideration of the specification in connection with the accompanying drawing, in which:

Figure 1 is a longitudinal sectional view of the adapter member;

Figure 2 is a side elevation of the tool holder detached from the adapter member shown in Figure 1;

Figure 3 is a longitudinal sectional view of the assembled adapter and tool holder; and Figure 4 is a cross sectional view on line 4—4 of Figure 3.

Referring more particularly to the drawing 1 denotes a substantially cone shaped adapter member which seats within the cone or spindle of a milling or other machine, not shown, notches 2 being provided in the collar 3 to insure tight interlocking of the parts against relative rotary movement. The adapter 1 is formed with axially tapered bore 4 in which a correspondingly exteriorally tapered cone shaped tool holder member 5 snugly seats. The collar 3 of the adapter is formed with a small opening 6 extending at right angles to the bore 4 and opening thereinto, as at 6. A preferably round pin 7 seated in the opening 6 is adapted to serve as a guide in properly positioning the tool holder within the adapter. Thus when the tool holder is inserted within the adapter with the flattened or cut away portion 8 of the former opposite the pin 7 of the latter, the tool holder will be in proper position to permit the combined locking and pressure screws 9 being screwed home.

When the tool holder and adapter have been assembled, it will be noted that the oppositely disposed dog screws 9 will not be in exact alignment with recesses 10 formed in opposite sides of the tool holder, but will nevertheless be in a position to partially enter said recesses when rotated in an appropriate direction, by a suitable tool not shown, the screws being hollow and squared internally at their outer ends for this purpose. While only two screws 9 are shown, more than two may be employed, and of course in such case the number of recesses 10 will be correspondingly increased.

It will be noted that the screws 9 are mounted in downwardly and inwardly inclined screw threaded openings 11 extending from the flattened angular faces 12 on collar 3 to the interior of bore 4. Also that the upwardly and inwardly inclined bottom walls 13 of recesses 10 are substantially parallel with the inner end faces of the screws. Consequently when screws 9 are screwed home, their inner ends will have substantial purchase against the bottom walls 13, thus forcing the holder downwardly to its seat with an evenly applied and distributed pressure. It is essential that the recesses 10 be slightly out of alignment with or inwardly offset with respect to screws 9, so that the inner ends of the screws may have relative sliding contact with the bottom wall of the recesses as the holder is forced downwardly. As the screw pressure is evenly distributed, and a minimum of friction is set up between the walls of the recesses and the ends of the screws and between the outer face of the tool holder and the wall of bore 4 respectively, all danger of binding or inaccurate seating is eliminated. The construction just described permits of relatively small dog screws being employed to seat and lock the tool holder against longitudinal movement, because the direction of the stress is in a straight line, coincident with the axis of the screws. Also because the entire driving stress is taken up by the pin 7 and flat surface 8, which positively lock the holder and adapter against turning or becoming loose. When the dog screws have once been set, the tool holder will positively be prevented from becoming loose, regardless of the direction in which pressure is applied, thus adapting the holder for drilling, milling and backfacing.

The locking and pressure members constitute an important part of my invention. They not only provide efficient means for forcing the tool holder axially to its seat but also compensate for any slight inaccuracy in machining of the driving connection between the adapter and the tool holder. Thus, any slight play between the pin 7 and flattened shoulder portion 8 will be taken up by the correspondingly slight relative movement of the inner ends of screws 9 relatively to the face of bottom walls 13 of recesses 10, and consequently no driving stress will be transmitted to the screws.

Any suitable tool, not shown, may be inserted in the bore 14 of holder 5 and locked in place by set screws 15.

Having thus described my invention, what I claim is:

The combination of an adapter for milling machines with a tool holder, comprising an adapter member formed with an axially slightly tapered bore, extending over a substantial length thereof, a tool holder having a cone shaped surface somewhat shorter than said tapered bore and snugly fitting same and diametrically opposed narrow inclined cut out portions in its cone-shaped surface between the opposite ends thereof, diametrically opposed rotatable locking and shifting members threadedly connected with said adapter member in inclined position with respect to the longitudinal axis of said member extending into the tapered bore thereof and cooperating with said cut-out portions for securing said tool holder to said adapter and forcing same axially into the tapered bore of said adapter member, and a key driving connection between said adapter and said tool holder comprising a pin secured to the wall of said adapter member and extending into the cone-shaped bore thereof, and a flat cut out portion in the cone-shaped outside wall of said tool holder engaging said pin.

CARL G. GASE.